United States Patent

Gadberry

[11] Patent Number: 6,108,141
[45] Date of Patent: Aug. 22, 2000

[54] SIGNAL VIEWING DEVICE

[76] Inventor: John W. Gadberry, 6353 Branch Hill-Miamiville Rd., Loveland, Miami Township, Ohio 45140

[21] Appl. No.: 09/146,016

[22] Filed: Sep. 2, 1998

Related U.S. Application Data

[60] Provisional application No. 60/051,183, Jun. 29, 1997.

[51] Int. Cl.[7] ............................... G02B 3/08; B60R 1/00
[52] U.S. Cl. ............................................ 359/742; 296/97.2
[58] Field of Search .................................. 359/742, 743; 296/97.1, 97.2, 97.3

[56] References Cited

U.S. PATENT DOCUMENTS

| | | |
|---|---|---|
| 1,637,309 | 7/1927 | David . |
| 1,731,284 | 10/1929 | Andel . |
| 1,808,208 | 6/1931 | David . |
| 2,109,932 | 3/1938 | Schneider . |
| 2,549,541 | 4/1951 | Squires . |
| 2,648,566 | 8/1953 | Zeder . |
| 3,628,854 | 12/1971 | Jampolsky ............................. 359/742 |
| 3,809,461 | 5/1974 | Baumgardner ........................ 350/302 |
| 3,809,462 | 5/1974 | Baumgardner ........................ 350/302 |
| 3,826,562 | 7/1974 | Baumgardner ........................ 350/286 |
| 4,286,846 | 9/1981 | Bollenbacher ........................ 350/436 |
| 5,316,360 | 5/1994 | Feikema ................................ 296/97.3 |
| 5,564,813 | 10/1996 | Curtindale ............................ 362/83.1 |
| 5,938,268 | 8/1999 | Wang et al. .......................... 296/97.2 |

*Primary Examiner*—Scott J. Sugarman
*Attorney, Agent, or Firm*—Jim Blackwood

[57] ABSTRACT

A Signal Viewing Device is comprised of a fresnel lens of a vinyl material to be applied to the inside top edge of a vehicle windshield to provide an enhanced field of view to the driver thereof.

20 Claims, 3 Drawing Sheets

SIGNAL VIEWING DEVICE

This is a continuation-in-part of, and incorporates by reference, inventor's application No. 60/051,183 filed Jun. 29, 1997 as a provisional application.

FIELD OF THE INVENTION

This Invention relates to Viewing devices for automobiles in general, and more particularly to viewing devices which enhance the driver's ability to discern the state of traffic control devices, such as signal lights.

DESCRIPTION OF RELATED ART

There has long existed a need for a device which will effectively allow the driver of a vehicle to safely and comfortably ascertain the status of a traffic control device when said driver's view is obstructed, by for instance, a vehicle roof, structural member, etc. This is evidenced by the number of attempts to create such a device as seen in a variety of patents issued on the aforementioned. These prior art devices, although somewhat effective in their objective, had various shortcomings. Many of them attempted too much, that is to say they were designed to convey or make available more than the minimum necessary amount of information, i.e. the status of the signal device. In the case of a common traffic light, this could be accomplished by showing the driver only the color of the light emitted by the signal, whereas most of these devices are designed to convey a sharp and clear image of the traffic control device to the driver. Another shortcoming is that the mounting systems of these devices was complex, and modern technological advances have enabled a much more practical mounting means when said mounting means is combined with the other features of the invention to be disclosed herein. A third shortcoming was that those prior art devices had a relatively narrow field of view, often necessitating the use of a multiplicity of such devices, positioned so as to provide a wider field of vision. Too, those devices tended to be comparatively thick, a situation aggravated by the last mentioned deficiency, and further increasing the difficulty of mounting the device.

For instance, in looking at one of the most recent of these, that of Dale E. Bollenbacher, U.S. Pat. No. 4,286,846 issued Sep. 1, 1981, we see that all of the above mentioned limitations are apparent. The device is needlessly complex, and would likely interfere with normal usage of the vehicle's sun visor.

Going back to H. H. Zeder, U.S. Pat. No. 2,648,566 issued Aug. 11, 1953 shows a similar device, but mounted in an external overhanging sun visor, and therefore adding to the disadvantages of the last device a fixed and unchangeable mounting position and exposure to the elements.

In April of 1951 U.S. Pat. No. 2,549,541 issued to Max U. Squires, with a suction cup mount is surely a device of a temporary nature, as is borne out by the lack of such devices in the cars we drive today. With its large mass and detent equipped adjustment it is virtually guaranteed to become dislodged. Its 50's based suction cup surely is no match for its environment.

Going farther back, we see that in March of 1938 Harvey C. Schneider, in U.S. Pat. No. 2,109,932 came up with the novel concept of combining his lens with the rear view mirror. Had the lens and mirror been separately adjustable this device would have been useful, but they were not.

As we go further back the devices become less sophisticated, such as Bruce W. David's U.S. Pat. No. 1,808,208, issued Jun. 2, 1931 in which he teaches of the dangers of a direct attachment between the lens and the windshield, resulting in the destruction of a perfectly good windshield. We also see that Frank S. Andel, along about Oct. 15, 1929 felt that a Plano-concavo glass lens mounted outside the car was clearly the way to go, as is shown in U.S. Pat. No. 1,731,284. And finally, Bruce David again, in July 1927 with his U.S. Pat. No. 1,637,309 shows us what he was talking about in his later patent as regards the destruction of windshields and the like, but at least he had that nice frosted edge.

Other patents of note would include the Baumgardner series, U.S. Pat. Nos. 3,809,461 3,809,462 3,826,562 and 3,972,596 issued May 7 and July 30 of 1974 and Aug. 3 of 1976. This Rube Goldbergian approach to improving rearward vision did however include a necessary element of the improved modern signal viewing device, viz, the fresnel lens, the elegant yet sophisticated structure that was to change the way we see traffic lights, perhaps forever. Also, on May 31, 1994 Orville A. Feikema disclosed a really neat sunvisor with a little hole in it so you could look through it when it was deployed. As if this wasn't enough, he gave it peep sights, shutters, and even a cover to restore it to its pre-aperture days. As you see, there have been some blindingly creative solutions to the age old problem of pulling up too close to traffic lights, but, the problems they revealed were as numerous as the solutions that were proffered.

Disclosed herein, therefore, you will find the answer to all these problems and more. For the Inventor has through providence, perceptiveness, and an iron willed dedication to the public good, designed and constructed a device so effective in its utter simplicity as to put all other attempts in the shade.

SUMMARY AND OBJECTS OF THE INVENTION

It is therefore an object of this invention to provide a new and improved signal viewing device.

It is also an object to disclose a means of simplifying the use and installation of the aforementioned device.

Further, it is an object to enable inexpensive manufacture of said device.

It is also an object to provide a signal viewing device which is unobtrusive and does not interfere with its neighbors.

Yet another object is to provide a signal viewing device with a wide field of view.

And yet still another object is to enable the installer of said device to easily and quickly modify the width and configuration of said field of view.

It is an object to provide a signal viewing device which is very much thinner and lighter than those in the prior ant.

It is an object to provide a device which, rather than providing additional projections, dangerous in the cockpit in case of mishap, would rather more likely provide some measure of additional padding and protection.

Also, it is an object to provide a device which provides a tunable interface between an unenhanced and an enhanced field of view which, with due care can be made nearly seamless in the conformity of said fields, one to another.

Lastly it is an object to enrich the public welfare by bringing to market a product long sought after by the public, which will answer their need for such a device simply, easily, at minor expense or inconvenience, whilst offering versatility in the bargain.

DESCRIPTION OF THE PREFERRED EMBODIMENT

Figure 1:
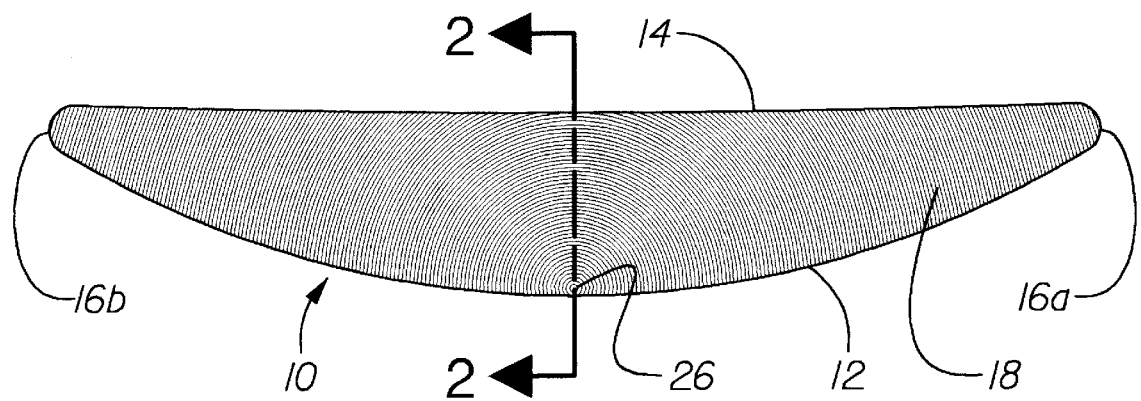
FIG. 1 is a frontal plan view of one embodiment of the invention.
Figure 5:
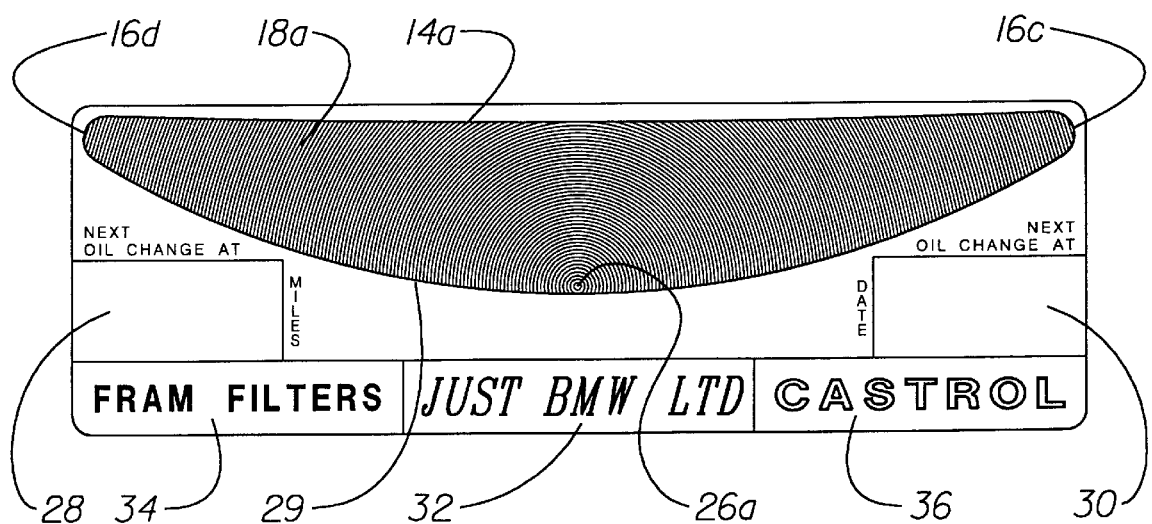
FIG. 5 shows an alternate embodiment of the invention wherein data blocks and banner spaces have been provided.

Referring now to FIG. 1, a signal viewing device (SVD) 10 is shown having a lower contour 12, an upper contour 14 (also 14a in FIG. 5), end contours 16a, 16b (also 16c and 16d in FIG. 5), and a viewing surface 18 (also 18a in FIG. 5).

Figure 2:
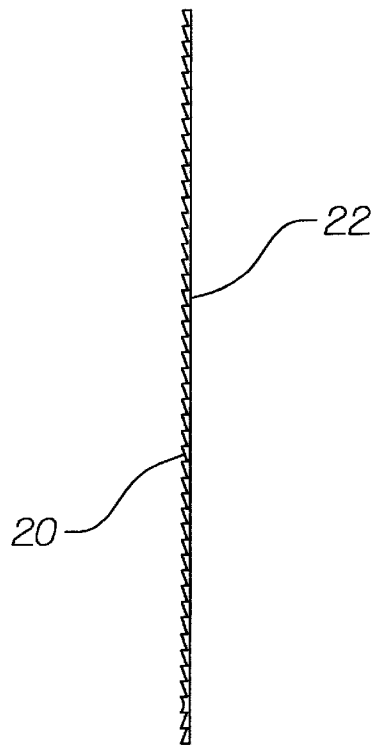
FIG. 2 is an enlarged sectional view taken along line 2—2 in FIG. 1.
Figure 3:
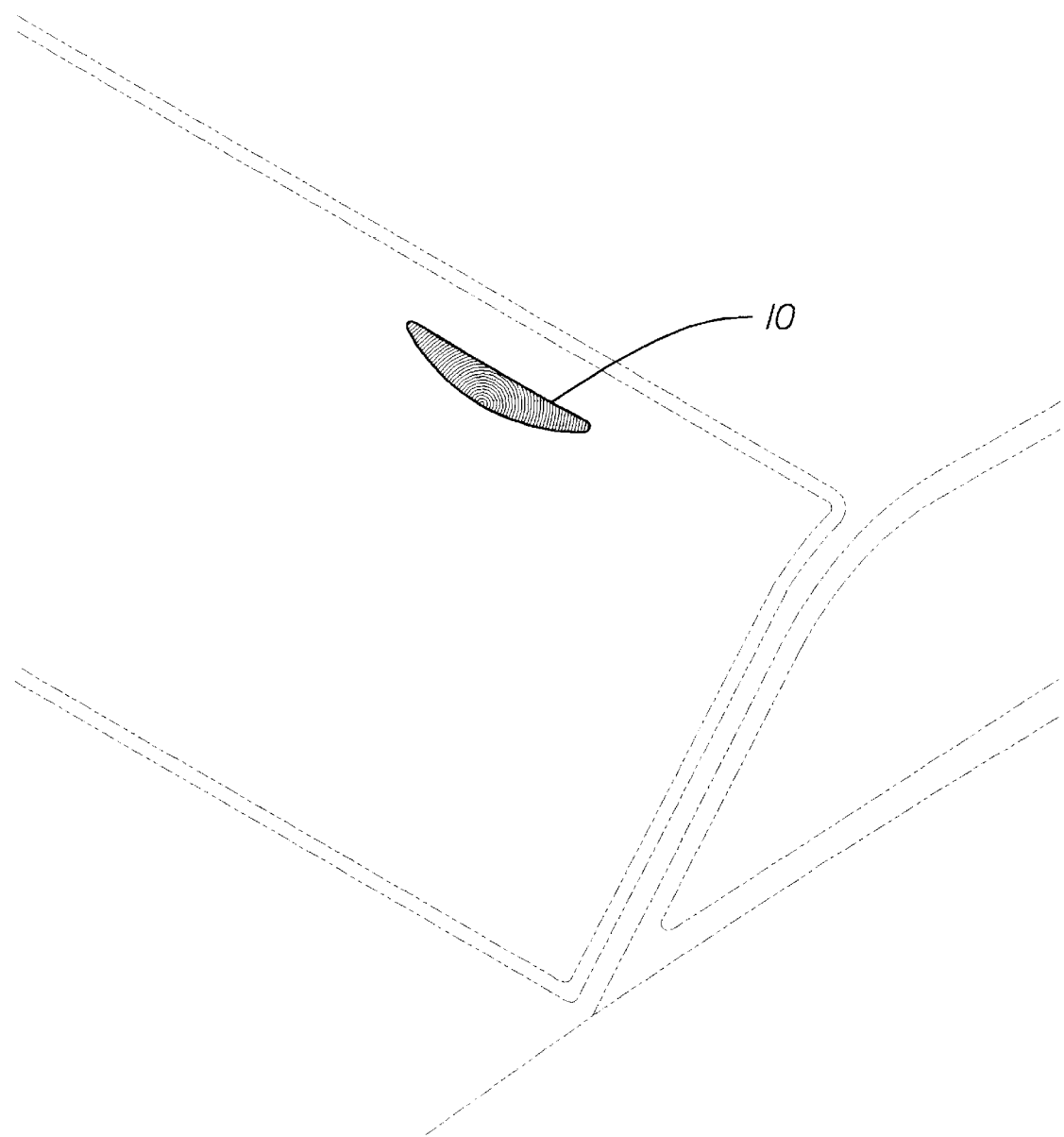
FIG. 3 shows an approximate installed position of one embodiment of the invention.
Figure 4:
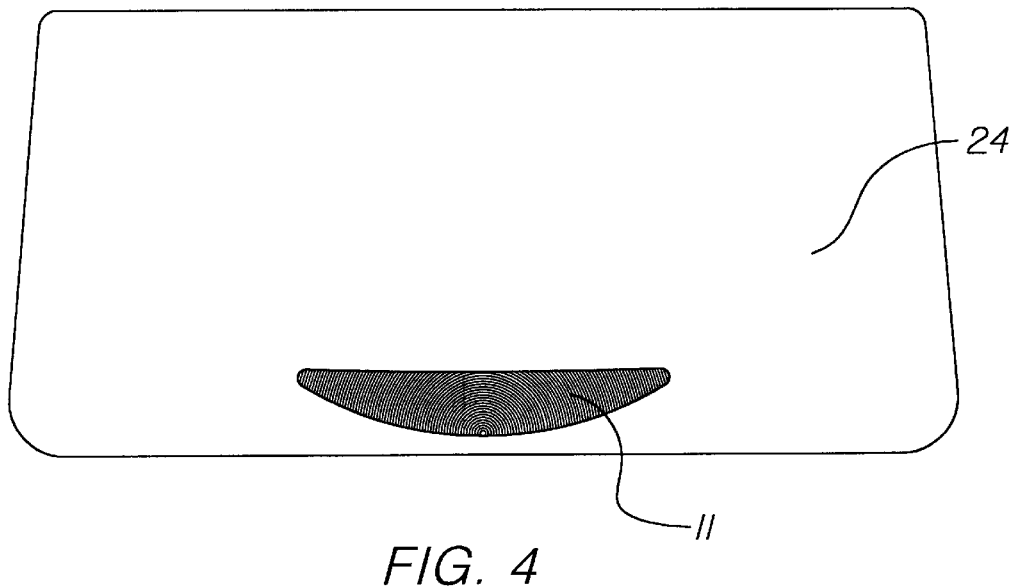
FIG. 4 shows an alternate embodiment of the invention wherein it is installed near the lower edge of a sun visor.

The viewing surface 18 is better seen in detail in FIG. 2 wherein a multitude of elements 20 are shown in profile. A smooth surface 22 is also shown. In FIG. 3 the SVD is shown installed inside a vehicle windshield, and in FIG. 4 an SVD 11 is shown in an alternate embodiment installed in a cut out portion near the lower edge of a sun visor 24. An optical center is shown 26 (and 26a in FIG. 5). FIG. 5 shows an embodiment including a lower lens contour 29 of the viewing surface 18a, data blocks 28 and 30 for storage of information, such as oil change time, and mileage intervals, or other similar uses, and banner spaces 32, 34, and 36, most suitably utilized for display purposes such as advertising space or similar uses.

The SVD 10 is comprised of a fresnel lens constructed of optical grade polyvinyl chloride or a like material having similar properties, and is similar to a commercially available lens sold by 3M company as part no. 051131-07952 called VANGARD-2® in its physical and optical characteristics, although the contour is much different, as is the application. The SVD 10 is applied to the inside of the vehicle's windshield as shown in FIG. 3 by cleaning the inside of the windshield, moistening tile smooth side of the SVD 10 and/or the inside of the windshield, and then positioning the SVD 10 on the inside at the top of the windshield in a position roughly in line between the driver's eyes and the approximate position where a signal would be located, and pressing the fluid out from between the windshield and the SVD 10. It should be noted that this position may vary somewhat for different vehicles and for different drivers, however, the greater range of vision afforded the driver over the prior art devices minimizes this effect. In the case of the alternate embodiment shown in FIG. 4, a more rigid material is preferred, and mounting is accomplished by conventional methods. As may be seen from FIG. 1 the SVD 10 has a generally curved outline to the lower edge or contour 12 (similar to that of the lower lens contour 29). This configuration is not limited to a curved shape, but is designed in a manner to maximize the driver's visual field into areas otherwise obscured to his vision, while not unduly becoming an object of obscurance itself. While a curved contour has been found most suitable for this purpose, further experimentation suggests that an asymmetrical shape is likely to offer advantages, such as in a vehicle with a highly curved windshield for example, and that further refinement of the shape may be expected. The upper contour 14 is shaped to loosely conform to the upper edge of the windshield, and in most cases will be in the shape of a straight line, or curved slightly. Since the material the lens is formed of is generally compliant, a good match to that edge may be had in most cases, and if not, the lens lends itself well to trimming with scissors or the like. This mode of matching may also be employed, in fine tuning the interface created by the lower contour 12 as hereinafter disclosed, and the SVD 10 may be truncated as well at any desirable point. The end contours 16a&b and 16c&d are shown as being rounded, thereby eliminating any sharp corners, however it is apparent that corners between ends 16 and upper contour 14 may be desirable, or that the lower contour 12 might usefully be extended to meet the upper contour 14 as a corner or with a diminished end contour 16. Also in the alternated embodiment shown in FIG. 4, the SVD 10 may be shaped so as to provide vision into those areas obscured by the sun visor 24 in which it is mounted, as well as that of the first embodiment.

Note that in FIG. 2 the generally saw toothed cross section of the fresnel lens is disclosed. Fresnel lenses are old and well known and need no further description, but it is worthwhile to observe that the clarity, sharpness, and discrimination of the object projected is to a large degree dependent upon optical factors such as the size of the lens elements 20, their focal length and power, and other such parameters as are familiar to those artisans involved in optical commerce, and any suitable parameters may be employed. Also, as shown in FIG. 1, the optical center 26 (and 26a in FIG. 5) of the lens coincides with, or is preferably a little above the lower contour 12 of the SVD 10. This provides an even split, or preferably a slight overlap in the relative fields of view, those being of the normal obstructed area, (or non-enhanced field of view), and of the enhanced field of vision available through the SVD 10, so that no blind spots are created. It is an object of the design of the lower contour 12 of the lens to likewise apply the aforementioned principle to the interface of that contour, between the normal field of vision and the enhanced field, all along the length of said contour, also for the abovementioned purpose, for which the aforementioned fine tuning may be employed.

An alternate embodiment of the invention is a fresnel lens having a clear adhesive backing, whereby said lens can be attached to the windshield of a car.

The embodiment shown and disclosed in FIG. 5 includes an enlarged body for the device, of which the viewing surface 18a comprises a portion. Also included, arranged in suitable relationship with the viewing surface are one or more data blocks 28 & 30, and/or one or more banner spaces 32, 34, & 36. In these areas, numerous special treatments may be employed, such as frosting, and/or opaque, translucent, and/or transparent colors or tinting, such as for printing of commercial advertisements, and the like. The data blocks may be treated so they can be written on for recording information such as the date and mileage of the next oil change, or other useful purpose.

Also, the SVD may be tinted if desired, to reduce the brightness of sunlight seen through the device.

As is apparent, the foregoing description, when taken in conjunction with the drawings referenced therein disclose the means of achieving the stated objectives. As is the convention, this disclosure is to be taken as non-limiting in the scope of the appended claims, such that common improvements falling within the scope of those claims are not to be excluded.

What is claimed is:

1. An optical device comprising:
  a) a fresnel lens, of a suitable shape to be attached to the upper edge of a vehicle front windshield,
  b) said lens may be attached to said front windshield by the following steps:
    I) creating an interface of fluid between said lens and said front windshield,
    II) positioning said lens on said front windshield and,
    III) diminishing the volume of said fluid, thereby causing said lens to adhere to said front windshield, whereby
  c) a driver of a vehicle which has the said lens attached to the front windshield thereof is able to see into an area which is otherwise blocked by the vehicle structure.

2. The device of claim 1 wherein:
  a) said fresnel lens is comprised of a flexible material.

3. The device of claim 2 wherein:
  a) said flexible material is in a class known as vinyl.

4. The device of claim 1 wherein:
  a) said fresnel lens is shaped to provide a driver of said vehicle with an enhanced field of view encompassing otherwise obstructed areas.

5. The device of claim 4 wherein:
  a) said enhanced field of view comprises an area generally forward and above said vehicle.

6. The device of claim 5 wherein;
  a) said enhanced field of view encompasses the generally known locations of traffic control devices occasionally not visible to said driver.

7. The device of claim 4 wherein:
  a) said lens may provide said enhanced field of view partially overlapping a non-enhanced field of view.

8. The device of claim 7 wherein:
  a) said lens may be fine-tuned to provide a nearly seamless interface between said enhanced and said non-enhanced fields of view.

9. The device of claim 4 further comprising at least a data block for
  storage of information.

10. The device of claim 4 further comprising at least a banner space for display purposes.

11. The device of claim 1 wherein the device is tinted.

12. An optical device comprising:
  a) a fresnel lens of a suitable shape to be mounted to a sunvisor of a vehicle,
  b) said device is configured to provide an enhanced field of view comprising an area obscured by said sunvisor.

13. A method of viewing traffic control devices comprising the steps of:
  a) manufacturing a fresnel lens capable of being attached to a front automobile windshield;
  b) attaching said lens to an upper extremity of said front windshield;
  c) from a driving position, viewing a traffic control device through said lens when said traffic control device would otherwise be obscured by the structure of said vehicle.

14. The method of claim 13 further comprising the step of:
  a) forming said fresnel lens from a flexible material.

15. The method of claim 14 further comprising the step of:
  a) creating a fluid interface between the surface of said windshield and said lens.

16. The method of claim 15 further comprising the step of:
  a) reducing the volume of said fluid in said interface to enhance the adhesion of said lens to said windshield.

17. The method of claim 13 further comprising the step of:
  a) attaching said lens with an adhesive.

18. The method of claim 13 further comprising the step of:
  a) providing said fresnel lens having at least a data block adjoiningly integral therewith.

19. The method of claim 18 further comprising the step of:
  a) recording data in said data block.

20. The method of claim 13 further comprising the steps of:
  a) providing said fresnel lens having at least a banner space adjoiningly integral therewith,
  b) using said banner space for display purposes.

* * * * *